UNITED STATES PATENT OFFICE.

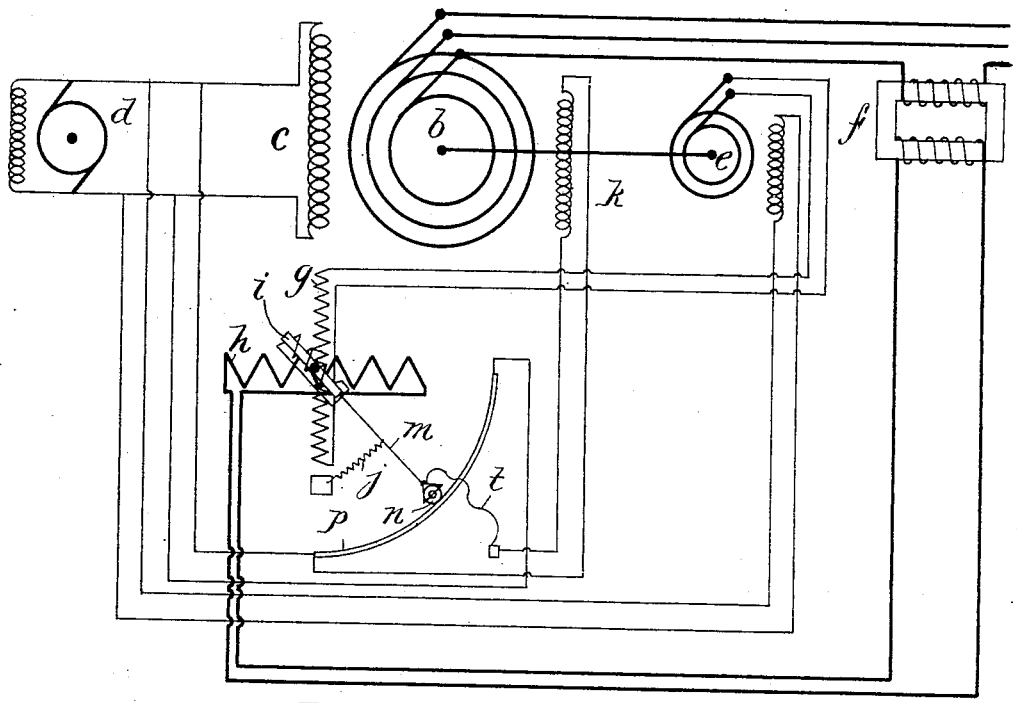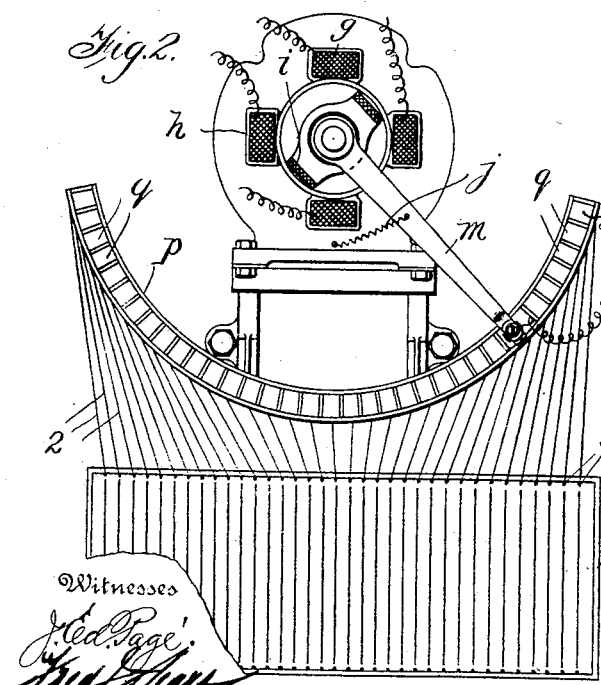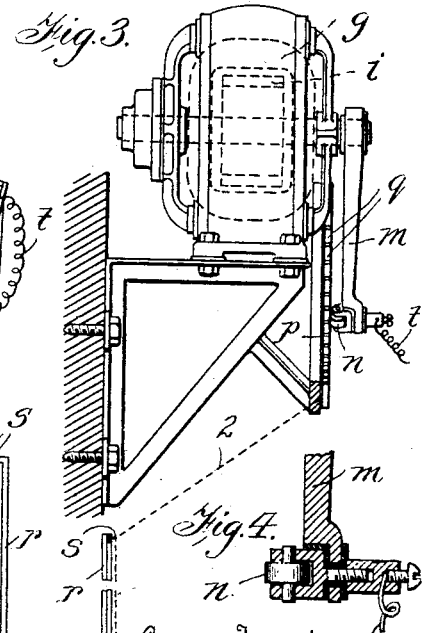

LOUIS ANTHYME HERDT, OF MONTREAL, QUEBEC, CANADA, ASSIGNOR OF ONE-HALF TO JULIEN DALEMONT, OF MONTREAL, CANADA.

DYNAMO.

969,161.  Specification of Letters Patent.  Patented Sept. 6, 1910.

Application filed December 19, 1908.  Serial No. 468,297.

*To all whom it may concern:*

Be it known that I, LOUIS ANTHYME HERDT, of the city of Montreal, Province of Quebec, Canada, have invented certain new and useful Improvements in Dynamos; and I do hereby declare that the following is a full, clear, and exact description of the same.

This invention relates particularly to the regulation of voltage or compounding of alternating current dynamos, and it has for its object to cause regulation or compounding to be effected through the change of angle between the no-load electromotive force of the dynamo and the load current thereof.

The invention may be said briefly to consist in means for exciting an alternator, and means varying such exciting means as the load current on the alternator varies and also as the phase angle varies between this load current and the no-load electromotive force of the alternator. For full comprehension, however of my invention reference must be had to the accompanying drawings in which—

Figure 1 illustrates diagrammatically the preferred embodiment of the invention; Fig. 2 is a transverse sectional view of the improved regulator proper including the resistance which is shown in diagram; Fig. 3 is a side elevation thereof; and Fig. 4 is a detail sectional view of the roller and its bearing.

Referring to Fig. 1, $b$ is a three phase alternator with two systems of exciting coils $c$ and $k$ respectively. The system, $c$ is excited from an ordinary direct current exciter $d$, or any other source of direct current in the ordinary manner. I provide an exciting-current regulator adapted to vary the exciting current in proportion to the load current and the angle between this load current and the no-load electromotive force of the alternator $e$ which no load electro-motive force is always the same as the electro-motive-force of the alternator $b$ when the latter is carrying no load (see Figs. 2, 3, and 4). This improved apparatus comprises the following devices:—A single phase alternator $e$ is coupled direct to the rotary member of the alternator $b$ so as to form a unitary structure, and this single phase alternator is excited from the same source as the three phase alternator, a current transformer $f$ being connected in series on one of the line wires from the alternator $b$, while a pair of coils $g$ and $h$ placed at 90 degrees electrical, are connected one, $g$, to the terminals of the single phase alternator and so arranged that the electro-motive force and current in this coil are in phase with the electro-motive-force of $e$, and consequently with the no-load E. M. F. of the alternator $b$; the other coil, $h$, being connected to the terminals of the secondary winding of the current transformer so that the current in this latter coil is in phase with the load current of the alternator $b$. A movable member preferably a closed coil $i$, is placed in the center of the two coils $g$ and $h$ and pivoted on an axis with a coiled spring $j$ adapted to resist rotation of such movable member. This member carries an insulated arm $m$ supporting at its end a roller $n$ of copper or other suitable conducting material, while a contact board $p$ in the form of an arc and provided with a plurality of separated and insulated contact points or segments $q$, is disposed in position to have the roller run thereon and such roller is electrically connected to one of the end contact segments by a flexible wire $t$ connected to the roller through the bearing and axle of the latter. These devices just described constitute the regulator proper, and in the operation thereof a variable resistance is required. The resistance I prefer to use consists of a resistance box $r$ having its wires divided into as many parts as there are points or segments on the board, and a series of binding posts $s$ mounted on the frame of the device are electrically connected to such parts.

I prefer to arrange the contact board, the roller and the actuating mechanism of the latter as a separate instrument from the resistance box in order that with this same instrument any suitable resistance box may be used. This instrument and the resistance box are connected as follows:—The contact points or segments of the current contact board have wires 2 fixed at one end thereto, and adapted to have their free ends engage the binding posts $s$ of the resistance. The torque or couple exerted on the movable member being proportional to the line current and also to the phase angle between the no-load electromotive force of the alternator $b$ and the line current, will set this movable member $i$ in such position that the angle it makes with the no-load current line, is proportional to the conditions first stated causing a direct current to flow through the exciting coils $k$, placed on the magnet cores of the three phase alternator proportional to the line current and the angle between the no-load electromotive force and this line current.

What I claim is as follows:—

1. The combination with an alternator and exciting means therefor, of means maintaining a current in such exciting means, means generating no-load electro-motive-force proportional to the electro-motive-force of the alternator when the said alternator is carrying no load, and means varying such exciting current in proportion to the angle between the said no-load electro-motive force and the load current.

2. The combination with an alternator and exciting means therefor, of means maintaining a current in such exciting means, means generating no-load electro-motive-force proportional to the electro-motive-force of the alternator when the said alternator is carrying no load, and automatic means varying such exciting current in proportion to the angle between the said no-load electro-motive force and the load current.

3. The combination with a three phase alternator an exciting coil therefor, and means maintaining a direct current in such exciting coil, of means generating no-load electro-motive force proportional to the electro-motive-force of the alternator when the said alternator is carrying no load, and means automatically varying the exciting current proportionally to the angle between the load current and the said no-load electromotive force of the alternator.

4. The combination with a three phase alternator an exciting coil therefor, and means maintaining a direct current in such exciting coil, of means generating no-load electro-motive-force proportional to the electro-motive-force of the alternator when the said alternator is carrying no load, and means automatically carrying the exciting current proportionally to the load current and the angle between the said load current and the said no-load electromotive force of the alternator.

5. The combination with a three phase alternator, exciting coils on the magnet cores thereof, and means maintaining a direct current in such exciting coils, of means generating no-load electro-motive-force proportional to the electro-motive-force of the alternator when the said alternator is carrying no load, and means automatically varying the exciting current proportionally to the load current and the angle between the said load current and the no-load electromotive force of the alternator.

6. The combination with the main circuit and exciting circuit of an alternator, of a coil on the magnetic circuit of the alternator, a circuit including the coil for the purpose of generating therein no-load electromotive-force proportional to the electro-motive-force of the alternator when the said alternator is carrying no load, and means for varying the current in the last mentioned circuit, the operation of such means being controlled by the variation of the angle between the load current and the no-load electromotive force of the alternator.

7. The combination with an alternator, of means operated in unison with such alternator and adapted to generate no-load electro-motive-force proportional to the electro-motive-force of the alternator when the latter is carrying no load, and an exciting current regulator adapted to vary the exciting current of the alternator in proportion to the load current and the angle between the load current of the alternator and the no-load electro-motive-force thereof.

8. The combination with an alternator, of a single phase alternator rotatively connected to the rotary part of such first mentioned alternator and adapted to generate no-load electro-motive-force proportional to the electro-motive-force of the first mentioned alternator when the latter is carrying no load, and an exciting current regulator adapted to vary the exciting current of the first mentioned alternator in proportion to the load current and the angle between the load current of the alternator and the no-load electro-motive force thereof.

In testimony whereof, I have signed my name to this specification, in the presence of two subscribing witnesses.

LOUIS ANTHYME HERDT.

Witnesses:
 WILLIAM P. McFEAT,
 FRED J. SEARS.